United States Patent
Obayashi et al.

(10) Patent No.: US 11,373,528 B2
(45) Date of Patent: Jun. 28, 2022

(54) PARKING MANAGEMENT SYSTEM AND PARKING MANAGEMENT METHOD

(71) Applicant: DENSO CORPORATION, Kariya (JP)

(72) Inventors: Hironori Obayashi, Kariya (JP); Takamasa Hidaka, Kariya (JP); Waka Sengoku, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/749,086

(22) Filed: Jan. 22, 2020

(65) Prior Publication Data

US 2020/0160713 A1   May 21, 2020

Related U.S. Application Data

(63) Continuation of application No. PCT/JP2018/027362, filed on Jul. 20, 2018.

(30) Foreign Application Priority Data

Jul. 26, 2017  (JP) .............................. JP2017-144328

(51) Int. Cl.
G08G 1/14 (2006.01)
G06Q 10/04 (2012.01)

(52) U.S. Cl.
CPC ........... *G08G 1/143* (2013.01); *G06Q 10/043* (2013.01); *G08G 1/148* (2013.01)

(58) Field of Classification Search
None
See application file for complete search history.

(56) References Cited

U.S. PATENT DOCUMENTS

| 5,091,727 A * | 2/1992 | Mahmood | G08G 1/14 235/384 |
| 9,026,351 B2 * | 5/2015 | Morimoto | G01C 21/3679 701/409 |
| 9,783,194 B2 * | 10/2017 | Seo | B60W 10/18 |
| 9,852,628 B2 * | 12/2017 | Hakeem | G08G 1/146 |

(Continued)

FOREIGN PATENT DOCUMENTS

| JP | 2007-285734 A | 11/2007 |
| JP | 2015-075899 A | 4/2015 |

(Continued)

*Primary Examiner* — Muhammad Adnan
(74) *Attorney, Agent, or Firm* — Maschoff Brennan

(57) ABSTRACT

A parking management system includes: a vacant slot sensor which detects a vacant slot among parking slots and creates vacant slot information indicating the position of the vacant slot; a vehicle information obtainment unit which obtains vehicle information of a vehicle; a first information obtainment unit which obtains first information indicating the presence or absence of a passenger of the vehicle; and a parking slot determination unit which determines a parking slot in which the vehicle is to be parked, and outputs the parking slot. When there are vacant slots and the first information indicates that a passenger is present, the parking slot determination unit determines, as the parking slot, a vacant slot located at a first distance from a facility which the passenger uses after alighting from the vehicle, preferentially over a vacant slot located at a second distance, which is greater than the first distance, from the facility.

7 Claims, 12 Drawing Sheets

(56) References Cited

U.S. PATENT DOCUMENTS

| | | | |
|---|---|---|---|
| 10,008,116 B1* | 6/2018 | Sandbrook | G08G 1/143 |
| 10,106,153 B1* | 10/2018 | Xiao | B60W 30/00 |
| 10,593,129 B2* | 3/2020 | Bruce | G07B 15/02 |
| 10,720,056 B2* | 7/2020 | Sweeney | G08G 1/005 |
| 10,733,891 B2* | 8/2020 | Chow | G08G 1/04 |
| 2012/0130872 A1* | 5/2012 | Baughman | G08G 1/146 |
| | | | 705/32 |
| 2013/0132102 A1* | 5/2013 | Andrade | G06Q 50/30 |
| | | | 705/1.1 |
| 2013/0176147 A1* | 7/2013 | Anderson | G08G 1/202 |
| | | | 340/932.2 |
| 2015/0149265 A1* | 5/2015 | Huntzicker | G06F 21/33 |
| | | | 705/13 |
| 2015/0353080 A1* | 12/2015 | Mukaiyama | E05B 77/54 |
| | | | 701/23 |
| 2016/0180712 A1* | 6/2016 | Rosen | G01C 21/36 |
| | | | 705/5 |
| 2017/0361835 A1* | 12/2017 | Tarte | G08G 1/147 |
| 2018/0096263 A1* | 4/2018 | Modi | G06Q 10/02 |
| 2018/0267536 A1* | 9/2018 | Goldberg | G05D 1/0088 |
| 2020/0160710 A1* | 5/2020 | Obayashi | H04W 4/024 |
| 2020/0180607 A1* | 6/2020 | Choi | G08G 1/166 |
| 2020/0207337 A1* | 7/2020 | Kim | B62D 15/02 |
| 2021/0331666 A1* | 10/2021 | Meng | G06K 9/00785 |

FOREIGN PATENT DOCUMENTS

| | | |
|---|---|---|
| JP | 2015-230641 A | 12/2015 |
| JP | 2016-007920 A | 1/2016 |
| JP | 2016042221 A * | 3/2016 |

* cited by examiner

PARKING MANAGEMENT SYSTEM AND PARKING MANAGEMENT METHOD

CROSS-REFERENCE TO RELATED APPLICATION

This application is based on and claims the benefit of priority from Japanese Patent Application No. 2017-144328 filed Jul. 26, 2017, and the entire disclosure of which is incorporated herein by reference.

BACKGROUND

Technical Field

The present disclosure relates to systems that assist autonomous vehicles in parking.

Related Art

At present, autonomous driving technology for vehicles have been developed. For example, techniques for existing manually-operated vehicles and autonomous vehicles to efficiently park in a situation in which these vehicles share parking spaces have been proposed.

SUMMARY

As an aspect of the present disclosure, a parking management system is provided which is for managing parking of a vehicle in a parking lot including a plurality of parking slots. The parking management system includes: a vacant slot sensor which detects a vacant slot among the plurality of parking slots in the parking lot and creates vacant slot information indicating a position of the vacant slot; a vehicle information obtainment unit which obtains vehicle information of a vehicle to which a parking slot is to be allocated; a first information obtainment unit which obtains first information indicating presence or absence of a passenger of the vehicle; and a parking slot determination unit which determines, using the vehicle information, the vacant slot information, and the first information, a parking slot in which the vehicle is to be parked, and outputs the parking slot. When there are a plurality of the vacant slots and the first information indicates that the passenger is present in the vehicle, the parking slot determination unit determines, as the parking slot in which the vehicle is to be parked, a vacant slot located at a first distance from a facility, preferentially over a vacant slot located at a second distance from the facility, among vacant slots which are included in the plurality of the vacant slots and in which the vehicle is allowed to be parked, the facility being used by the passenger after alighting from the vehicle, the second distance being greater than the first distance.

BRIEF DESCRIPTION OF THE DRAWINGS

In the accompanying drawings.

DETAILED DESCRIPTION OF THE PREFERRED EMBODIMENTS

At present, autonomous driving technology for vehicles have been developed. For example, techniques for existing manually-operated vehicles and autonomous vehicles to efficiently park in a situation in which these vehicles share parking spaces have been proposed.

JP 2016-007920 A discloses a vehicle control device which determines, according to priority determined on the basis of predetermined vehicle mode types, whether to park the own vehicle in a vacant parking space. In JP 2016-007920 A, as the vehicle mode types, the following are defined: (i) manual operation in which a passenger performs the entire operations of the own vehicle; (ii) manned autonomous operation in which a control system of the vehicle automatically performs a part or all of the operations of the own vehicle in a state where a passenger is present; and (iii) unmanned autonomous operation in which the control system of the vehicle automatically performs all the operations of the own vehicle in a state where no passenger is present. As the method for determining the priority, disclosed are (i) an example in which manual operation and manned autonomous operation have higher parking priority than unmanned autonomous operation and (ii) an example in which manual operation has higher parking priority than manned autonomous operation. Furthermore, the following are disclosed for the case where a plurality of vehicle mode types are the same; (i) an example in which the parking priority increases as the time elapsed since a vehicle begins searching for a vacant parking space increases, and (ii) an example in which the parking priority increases as the distance between the current position of a vehicle and a parking space increases.

JP 2016-007920 A describes allocating a vacant parking space earlier to a vehicle having a higher priority mode type. However, the relationship between the priority and the position of a vacant parking space is not taken into consideration in JP 2016-007920 A.

The present disclosure has been conceived to solve the aforementioned problem.

A. First Embodiment

Figure 1:
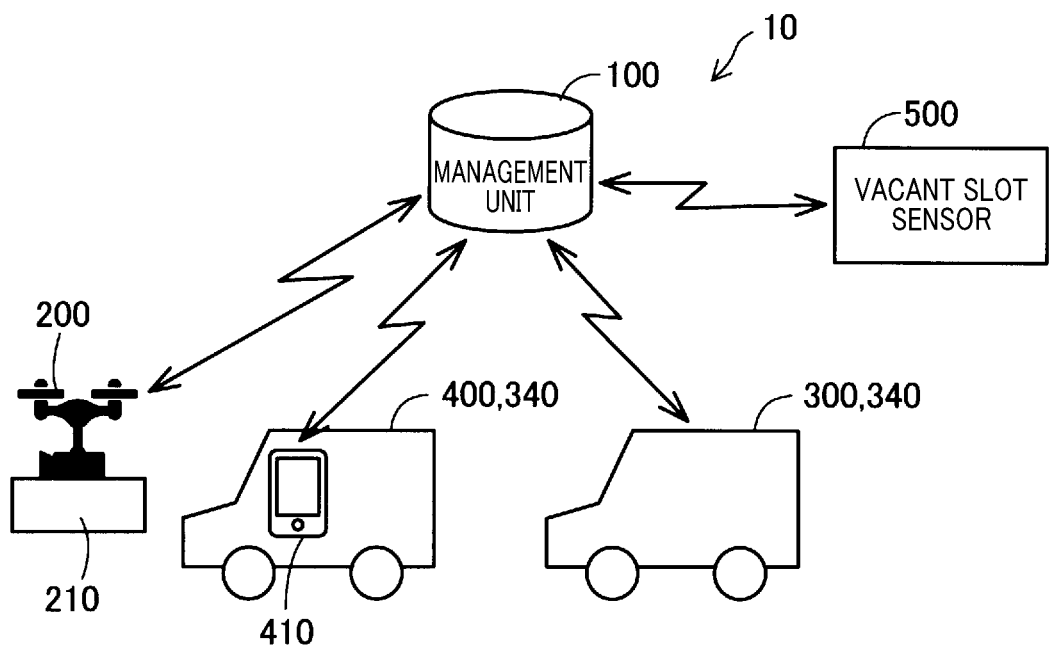
FIG. 1 is a schematic diagram schematically showing a parking management system as the first embodiment of the present disclosure.

A parking management system 10 shown in FIG. 1 includes: a vacant slot sensor 500 which detects a vacant slot in a parking lot including a plurality of parking slots; a management unit 100 which assists an autonomous vehicle 300 and a manually-operated vehicle 400 in traveling in the parking lot; and a mobile body 200 which informs a driver of the manually-operated vehicle 400 of a travel route. Hereinafter, both the autonomous vehicle 300 and the manually-operated vehicle 400 will be referred to as vehicles 340 when no distinction is made therebetween. The mobile body 200 in the present embodiment will also be referred to as a "first mobile body".

The vacant slot sensor 500 detects a vacant slot in the parking lot and creates vacant slot information indicating the position of the detected vacant slot. The vacant slot sensor 500 transmits the vacant slot information to the management unit 100.

When receiving an entry request from the autonomous vehicle 300 or a mobile terminal 410 carried by a passenger of the manually-operated vehicle 400, the management unit 100 determines a parking slot in which a vehicle 340 is to be parked. The management unit 100 calculates a travel route to said parking slot and transmits route information indicating the travel route to the autonomous vehicle 300, the mobile body 200, etc. Hereinafter, the parking slot determined by the management unit 100 as a parking slot which the vehicle 340 that has transmitted the entry request is to be parked will also be referred to as a "first parking slot".

The mobile body 200 includes a display 210. While in motion, the mobile body 200 guides the manually-operated vehicle 400 to the first parking slot. Upon guiding the manually-operated vehicle 400, the mobile body 200 moves while displaying, on the display 210, a guidance indication of the travel route to the first parking slot for the manually-operated vehicle 400, using the route information received from the management unit 100. In the embodiment, an unmanned aerial vehicle, also known as a drone, is used as the mobile body 200. Aside from the drone, a vehicle can be used as the mobile body 200.

The manually-operated vehicle 400 does not have autonomous driving functions. In the present embodiment, a passenger of the manually-operated vehicle 400 uses his or her own mobile terminal 410 to transmit an entry request to the management unit 100. For example, the passenger of the manually-operated vehicle 400 introduces, into a smartphone, a tablet device, or the like as the mobile terminal 410, application software for usage of the parking lot to enable the mobile terminal 410 to transmit the entry request. The driver of the manually-operated vehicle 400 drives following the guidance indication about the travel route displayed on the display 210 of the mobile body 200 and parks the manually-operated vehicle 400 in the first parking slot. The meaning of the term "passenger" includes the driver and a passenger other than the driver.

The autonomous vehicle 300 includes: a function of transmitting the entry request; and a function of obtaining the route information and driving itself according to the obtained route information. The autonomous vehicle 300 receives the route information from the management unit 100, drives itself according to the received route information, and automatically parks in the first parking slot. In the present embodiment, the meaning of self-driving includes: driving of the autonomous vehicle 300 in which a driver is on board; and driving of the autonomous vehicle 300 in which no driver is on board.

Figure 2:
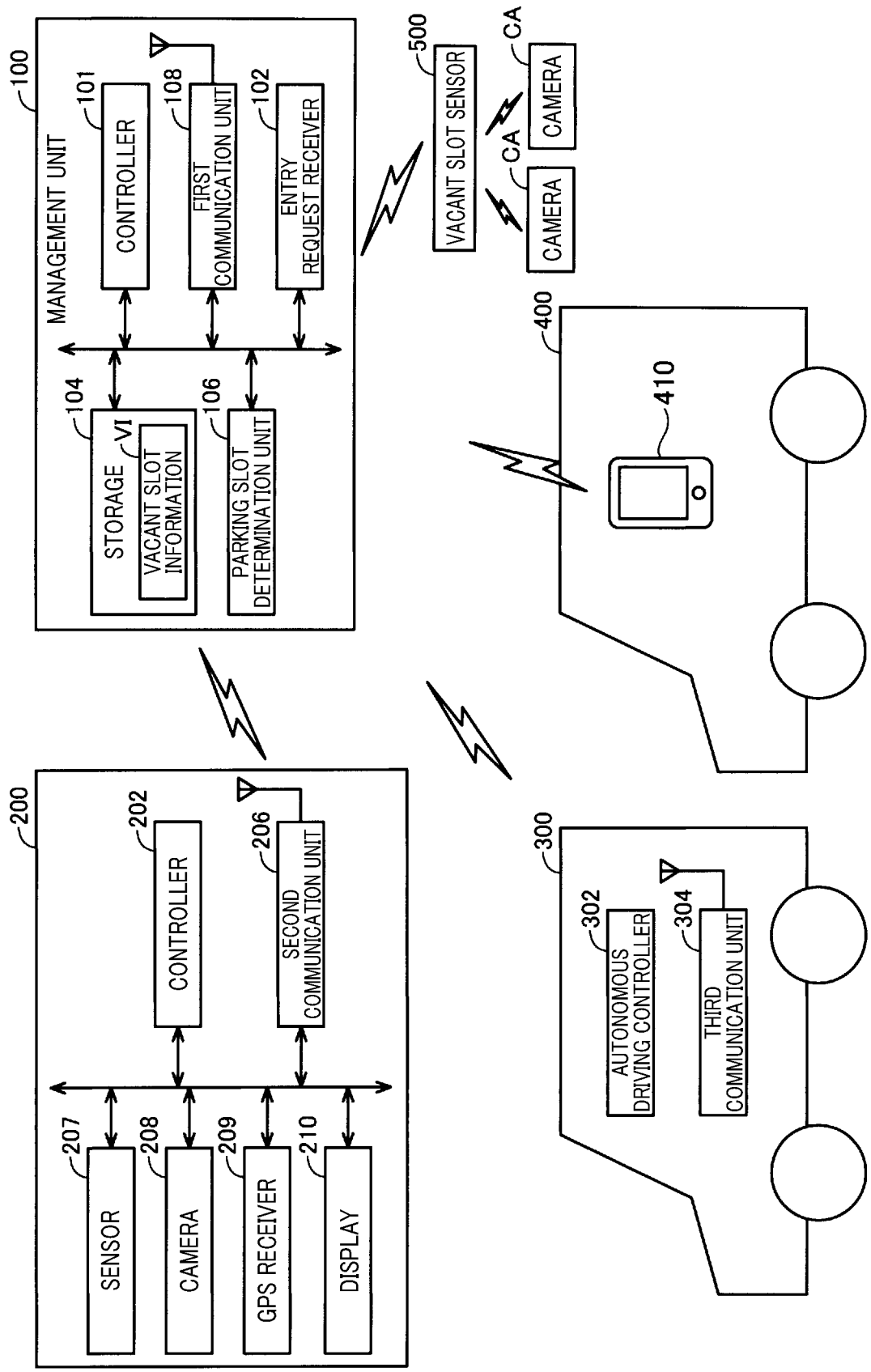
FIG. 2 is a block diagram showing a schematic configuration of the parking management system.

As shown in FIG. 2, the management unit 100 includes: a controller 101 which controls each portion of the management unit 100; an entry request receiver 102 which receives entry requests from the mobile terminal 410 and the autonomous vehicle 300; a storage 104 in which vacant slot information VI received from the vacant slot sensor 500 is stored; a parking slot determination unit 106; and a first communication unit 108. The management unit 100 includes a computer with a CPU, a ROM, and a RAM, which are not shown in the drawings. The CPU transfers, into the RAM, a control program stored in advance in the ROM and executes the control program; thus, the function of each portion of the management unit 100 indicated above is implemented. The management unit 100 can be configured as a server computer or cloud computing, for example.

The first communication unit 108 demodulates radio waves received via an antenna and thus generates data, and generates and modulates radio waves to be transmitted via the antenna. As the wireless communication, for example, wireless communication according to not only standardized communication methods such as various wireless local area networks (LANs) defined in the Institute of Electrical and Electronics Engineers (IEEE) 802.11, Z-Wave (registered trademark), Zigbee (registered trademark), and Bluetooth (registered trademark), but also wireless communication according to arbitrary communication methods that have not been standardized can be used. The first communication unit 108 is further configured to be able to perform communication via a wide-area network as well. Examples of the wide-area network include communication networks owned by various telecommunication carriers, such as a cell-phone network, local area networks (LANs) connected to these communication networks, and the Internet. The management unit 100 communicates with the mobile body 200, the autonomous vehicle 300, the mobile terminal 410, and the vacant slot sensor 500 via the first communication unit 108.

The mobile body 200 includes: a controller 202 which controls movement of the mobile body 200; a second communication unit 206; a sensor 207; a camera 208; a GPS receiver 209; and the display 210. The mobile body 200 includes a computer with a CPU, a ROM, and a RAM, which are not shown in the drawings. The CPU develops, in the RAM, a control program stored in advance in the ROM and executes the control program; thus, the function of each portion of the mobile body 200 indicated above is implemented.

As the sensor 207, a millimeter wave radar, a laser radar, or the like can be used. As the camera 208, a CCD camera, a CMOS camera, or the like can be used. As the display 210, for example, a liquid-crystal display, an organic EL (electroluminescent) display, an LED display, a bulb-type electronic message board, or various display screens can be used. The combination of the controller 202 and the display 210 in the present embodiment is also referred to as a "notifier".

As with the first communication unit 108, the second communication unit 206 demodulates radio waves received via an antenna and thus generates data, and generates and modulates radio waves to be transmitted via the antenna. The second communication unit 206 does not need to be configured to be able to perform communication via a wide-area network.

The autonomous vehicle 300 includes an autonomous driving controller 302 and a third communication unit 304. The autonomous vehicle 300 includes an ECU (electronic control unit) with a CPU, a ROM, and a RAM, which are not shown in the drawings. The CPU develops, in the RAM, a control program stored in advance in the ROM and executes the control program; thus, the function of each portion of the autonomous vehicle 300 is implemented.

As with the first communication unit 108, the third communication unit 304 demodulates radio waves received via an antenna and thus generates data, and generates and modulates radio waves to be transmitted via the antenna.

The vacant slot sensor 500 receives images captured by a plurality of cameras CA and analyzes the captured images to detect a vacant slot among the plurality of parking slots. The vacant slot sensor 500 creates vacant slot information VI indicating the position of the vacant slot and transmits the vacant slot information VI to the management unit 100. In the present embodiment, existing cameras installed in the parking lots are used as the cameras CA. The cameras installed in the parking lot will also be referred hereinafter to as infrastructural cameras. Furthermore, a program used in an existing vacant slot sensing device which detects a vacant slot using infrastructural cameras can be remodeled so that the existing vacant slot sensing device is used as the vacant slot sensor 500 according to the present embodiment. The combination of the vacant slot sensor 500 and the camera CA in the present embodiment is also referred to as a "vacant slot sensor".

Figure 3:
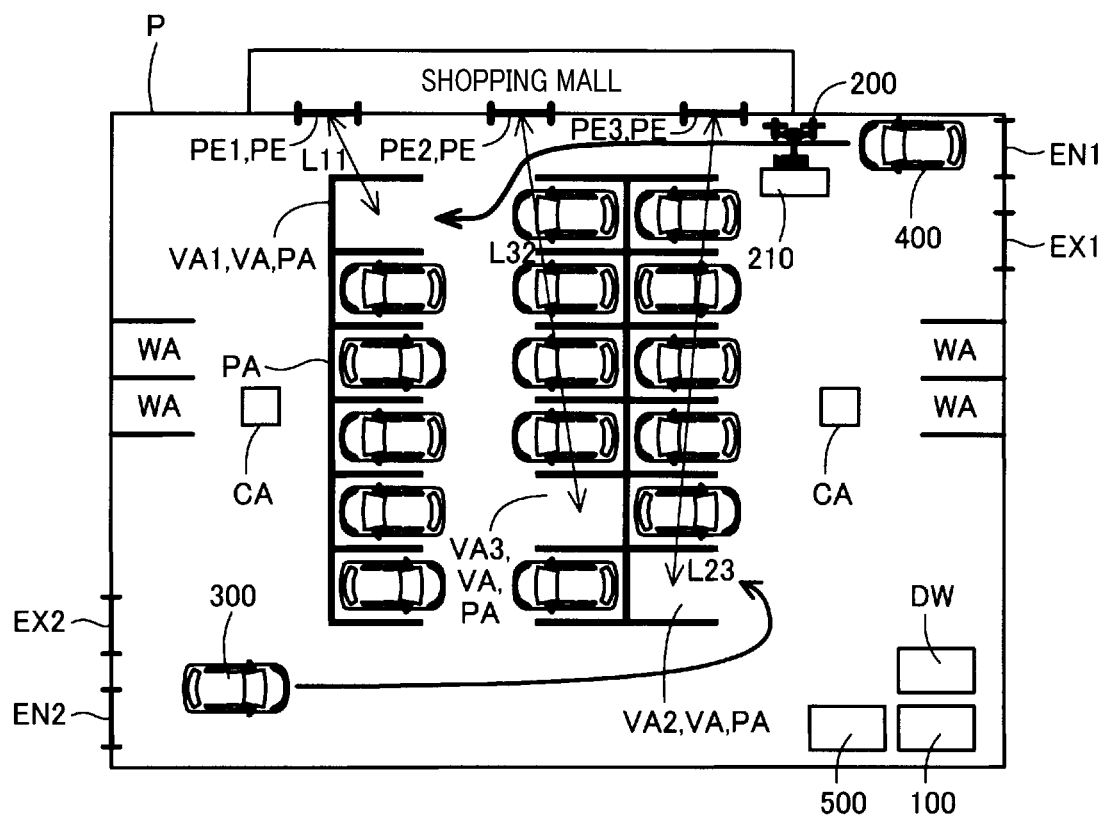
FIG. 3 is an explanatory diagram for explaining parking management by the parking management system.

FIG. 3 shows a parking lot P attached to a shopping mall, as an example of a parking lot into which the parking management system 10 according to the present embodiment has been introduced. The parking lot P includes: a plurality of parking slots PA; a plurality of wait slots WA; passenger exits PE1, PE2, PE3; vehicle entrances EN1, EN2; and vehicle exits EX1, EX2. In the present embodiment, the passenger exits PE1, PE2, PE3 are exits of the parking lot and are entrances of the shopping mall. The passenger exits PE1, PE2, PE3 are facilities which the passenger uses after alighting from the vehicle 340. FIG. 3 shows a situation in which among the plurality of parking slots PA, three parking slots PA are vacant. The three vacant parking slots PA are referred to as vacant slots VA1, VA2, VA3. Note that the three vacant slots VA1, VA2, VA3 are referred to as "vacant slots VA" when no distinction is made therebetween. Similarly, the passenger exits PE1, PE2, PE3, the vehicle entrances EN1, EN2, and the vehicle exits EX1, EX2 are each denoted using a reference sign with the number at the end thereof removed when no distinction is made therebetween. The wait slots WA are for the autonomous vehicle 300 and the manually-operated vehicle 400 to wait when vehicles are parked in all the plurality of parking slots PA, that is, the parking lot is full. The wait slot WA is disposed near the vehicle entrance EN, at a position different from the position of the parking slot PA, and has the same area as the parking slot PA. In the example shown in FIG. 3, each of the parking slots PA included in the parking lot P has an area great enough for parking of a vehicle 340 having the greatest overall length and vehicle width among the vehicles 340 that can use the parking lot P. The passenger exit PE in the present embodiment is also referred to as an "exit for vehicle passengers".

The parking lot P includes two cameras CA. Images of all the parking slots PA can be captured by the two cameras CA. The vacant slot sensor 500 and the management unit 100 are disposed in the parking lot P. FIG. 3 shows a situation in which the mobile body 200 is guiding the manually-operated vehicle 400.

Hereinafter, parking management by the parking management system 10 according to the present embodiment is described with reference to FIGS. 2 to 11. In the present embodiment, the vacant slot sensor 500 detects a vacant slot VA in a period of time in which the parking lot P is open to use, and when a change occurs in the vacant slot information VI, transmits the vacant slot information VI to the management unit 100. When receiving the vacant slot information VI from the vacant slot sensor 500, the controller 101 of the management unit 100 (refer to FIG. 2) stores the received vacant slot information VI to the storage 104. In other words, every time the management unit 100 receives the vacant slot information VI, the vacant slot information VI stored in the storage 104 is updated. The vacant slot sensor 500 may be configured to transmit the entire vacant slot information VI to the management unit 100 regardless of whether the vacant slot information VI has been changed or not.

Figure 4:
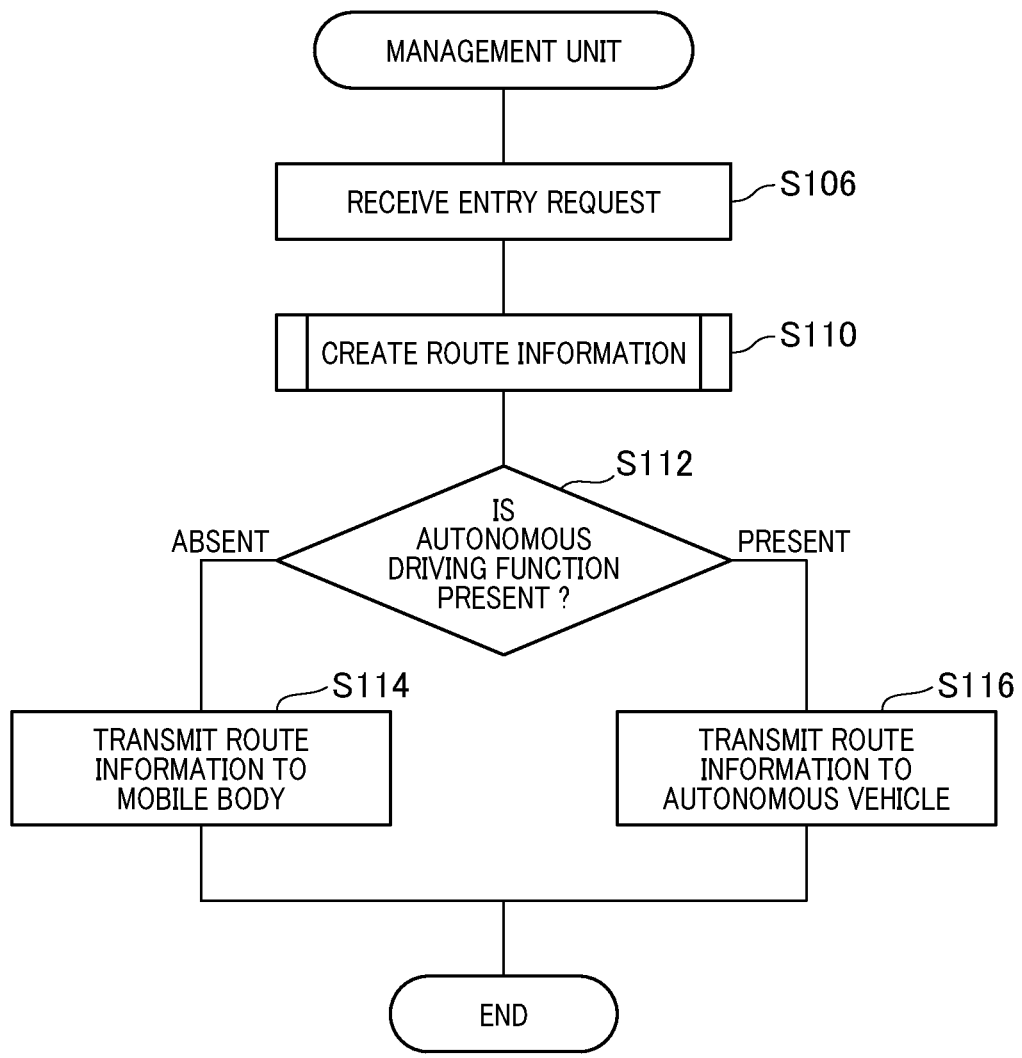
FIG. 4 is a flowchart showing the flow of a parking management process performed by a management unit.

FIG. 4 is a flowchart showing the flow of a parking management process performed by the management unit. The parking management process shown in FIG. 4 is performed every time the management unit 100 receives the entry request. In Step S106, the entry request receiver 102 (refer to FIG. 2) receives the entry request. The entry request is transmitted from the third communication unit 304 controlled by the autonomous driving controller 302 of the autonomous vehicle 300 or the mobile terminal 410 carried by a passenger of the manually-operated vehicle 400. The entry request includes identification information of the vehicle 340, current position information of the vehicle 340, and first information of the vehicle 340 which indicates the presence or absence of a passenger.

The identification information includes, for example, size information indicating the dimensions of a vehicle that includes the overall length, the width (hereinafter also referred to as a "vehicle width"), and the height of the vehicle; second information indicating the presence or absence of the autonomous driving function; and communication identification information for performing communication with the management unit 100.

For example, the first information included in the entry request transmitted by the autonomous vehicle 300 may indicate that a passenger is present or may indicate that a passenger is absent. The second information included in the entry request transmitted by the autonomous vehicle 300 indicates the presence of the autonomous driving function.

Furthermore, the first information included in the entry request transmitted from the mobile terminal 410 carried by a passenger of the manually-driving vehicle 400 indicates that a passenger is present, and the second information included in the entry request transmitted from the mobile terminal 410 carried by the passenger of the manually-driving vehicle 400 indicates the absence of the autonomous driving function. Using the event of the entry request being received by the entry request receiver 102 (refer to FIG. 2) as a trigger, the controller 101 causes the parking slot determination unit 106 to start creating the route information.

The identification information (including the size information, the second information, and the communication identification information) and the current position information in the present embodiment are also collectively referred to as "vehicle information". The entry request receiver 102 that obtains the vehicle information included in the entry request in the present embodiment is also referred to as a "vehicle information obtainment unit". The entry request receiver 102 that obtains the first information included in the entry request in the present embodiment is also referred to as a "first information obtainment unit".

In Step S110, the parking slot determination unit 106 (refer to FIG. 2) determines the parking slot PA (in other words, the first parking slot) in which the vehicle 340 that has transmitted the entry request is to be parked, and creates route information indicating a travel route from the current position of the vehicle 340 to the first parking slot. Details of the route information creation process in Step S110 will be described later.

In Step S112, using the second information included in the entry request, the parking slot determination unit 106 determines whether or not the vehicle 340 has the autonomous driving function. When the vehicle 340 does not have the autonomous driving function, in other words, when the entry request is transmitted from the mobile terminal 410 carried by the passenger of the manually-operated vehicle 400, the parking slot determination unit 106 transmits the route information to the mobile body 200 (Step S114). As a result of the process in Step S114, information of a parking slot in which the vehicle is to be parked is output to the mobile body 200 as information of a destination included in the route information. Thereafter, the route information creation process ends. On the other hand, when the vehicle 340 has the autonomous driving function, in other words, when the entry request is transmitted from the autonomous vehicle 300, the parking slot determination unit 106 transmits the route information to the autonomous vehicle 300 (Step S116). As a result of the process in Step S116, information of a parking slot in which the vehicle is to be parked is output to the autonomous vehicle 300 as information of a destination included in the route information. Thereafter, the route information creation process ends.

Figure 5:
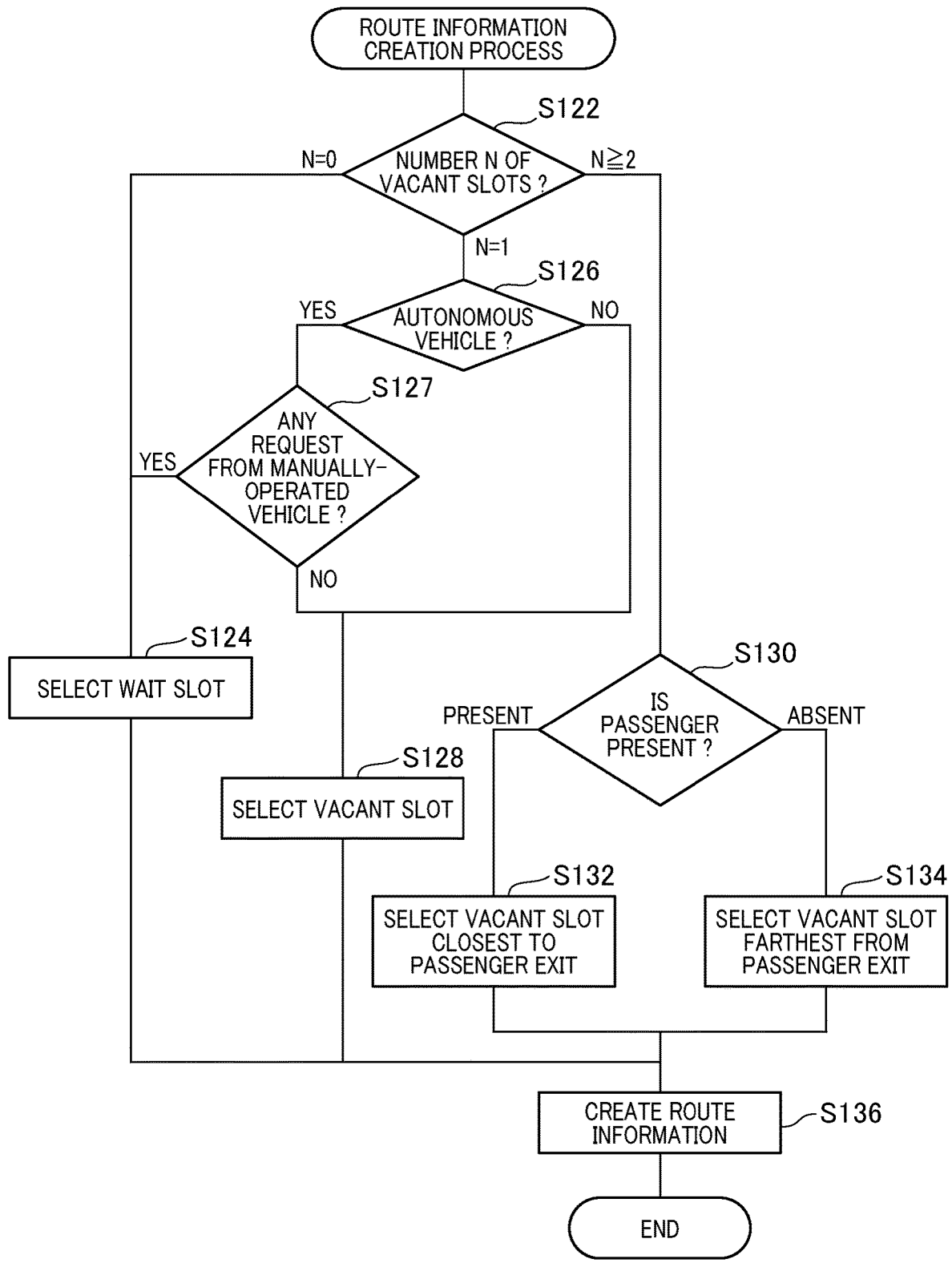
FIG. 5 is a flowchart showing the flow of a route information creation process.

FIG. 5 is a flowchart showing the flow of the route information creation process. By following the route information creation process shown in FIG. 5, the parking slot determination unit 106 determines, using the vehicle information (including the size information, the second information indicating the autonomous driving function, and the current location information), the vacant slot information, and the first information indicating the presence or absence of a passenger, a parking slot in which the vehicle is to be parked.

In the route information creation process, the parking slot determination unit 106 identifies the number N of vacant slots using the vacant slot information VI stored in the storage unit 104 (Step S122). When N=0, that is, when the parking lot is full, the parking slot determination unit 106 selects the wait slot WA as the first parking slot (Step S124).

When N=1, that is, when there is one vacant slot VA, the parking slot determination unit 106 determines, using the second information included in the entry request, whether the vehicle 340 is an autonomous vehicle (Step S126). When the second information indicates the presence of the autonomous driving function, the parking slot determination unit 106 determines whether any entry request has been received from a manually-operated vehicle (Step S127). When the entry request receiver 102 receives an entry request after the entry request used in Step S126 and the entry request transmitted from the manually-operated vehicle 400 is included, the parking slot determination unit 106 selects the wait slot WA as the first parking slot for the vehicle 340 (Step S124). When the entry request receiver 102 has not received an entry request after the entry request used in Step S126 and when the entry request transmitted from the manually-operated vehicle 400 is not included in the entry request received by the entry request receiver 102 after the entry request used in Step S126, the parking slot determination unit 106 selects the vacant slot VA as the first parking slot (Step S128). Furthermore, when the second information included in the entry request received in Step S106 (refer to FIG. 4) indicates the absence of the autonomous driving function (No in Step S126), the parking slot determination unit 106 selects the vacant slot VA as the first parking slot (Step S128).

Note that in the example shown in FIG. 3, since the parking lot P has two vehicle entrances EN1, EN2, the management unit 100 may receive the entry requests almost simultaneously. Therefore, the route information creation process shown in FIG. 5 includes Step S127. For example, in the case of a relatively small parking lot, etc., having only one vehicle entrance EN, the entry requests are likely to be received at intervals, and thus Step S127 may be omitted in the route information creation process. In the case where Step S127 is omitted, when the current vehicle is determined as an autonomous vehicle in Step S126, the process in Step S124 is performed. Furthermore, Step S126 may be omitted in the route information creation process. Specifically, when the number N of vacant slots is 1, a vacant slot may be selected regardless of whether the current vehicle is an autonomous vehicle (Step S128).

When N≥2, that is, when there are two or more vacant slots VA, the parking slot determination unit 106 determines the absence or presence of a passenger of the vehicle 340 using the first information included in the entry request (Step S130). When the first information indicates that a passenger is present, the parking slot determination unit 106 selects, as the first parking slot, the vacant slot VA located at the shortest distance to the passenger exit PE (Step S132).

Note that in the present embodiment, the distance between the vacant slot VA and the passenger exit PE is the distance, on a map, between the position of the center of gravity of the vacant slot VA and a structural portion of the passenger exit PE that is closest to the position of the center of gravity of said vacant slot VA. When there is more than one passenger exit PE, the "distance to the passenger exit PE" from each vacant slot VA is the distance to the passenger exit PE closest to said vacant slot VA. For example, in the example shown in FIG. 3, the "distance to the passenger exit PE" from a vacant slot VA1 is a distance L11 between the vacant slot VA1 and a passenger exit PE1. The "distance to the passenger exit PE" from a vacant slot VA2 is a distance L23 between the vacant slot VA2 and a passenger exit PE3. The "distance to the passenger exit PE" from a vacant slot VA3 is a distance L32 between the vacant slot VA3 and a passenger exit PE2. The distance L23 between the vacant slot VA2 and the passenger exit PE3 and the distance L32 between the vacant slot VA3 and the passenger exit PE2 is greater than the distance 11 between the vacant slot VA1 and the passenger exit PE1.

The "distance L11 between the vacant slot VA1 and the passenger exit PE1" in the present embodiment is also referred to as a "first distance". The "distance L23 between the vacant slot VA2 and the passenger exit PE3" and the "distance L32 between the vacant slot VA3 and the passenger exit PE2" are also referred to as a "second distance".

When the management unit 100 receives the entry request from the mobile terminal 410 carried by a passenger of the manually-operated vehicle 400, by way of the process in Step S130, the parking slot determination unit 106 selects, as the first parking slot for the manually-operated vehicle 400, the vacant slot VA1 located at a shorter distance to the passenger exit PE (specifically, to the passenger exit PE1) than the other vacant slots VA2, VA3 are among the plurality of vacant slots VA (refer to Step S132).

As mentioned above, the entry request includes the identification information of the vehicle 400, and the identification information includes the second information indicating the presence or absence of the autonomous driving function. Therefore, in Step S126, the parking slot determination unit 106 can identify a manually-operated vehicle 400 among the vehicles 340 using the entry request transmitted from the mobile terminal 410. On the other hand, when the first information indicates the absence of a passenger of the vehicle 340 in Step S130, the parking slot determination unit 106 selects, as the first parking slot, the vacant slot VA located at the greatest distance to the passenger exit PE (Step S134). For example, in the case where the passenger is absent in the autonomous vehicle 300 shown in FIG. 3, when the management unit 100 receives the entry request from the autonomous vehicle 300, the parking slot determination unit 106 selects, as the first parking slot for the autonomous vehicle 300, the vacant slot VA2 located at the distance L23 to the passenger exit PE which is greater than the distances L11, L32 of the other vacant slots VA1, VA3, among the plurality of vacant slots VA.

In Step S136, the parking slot determination unit 106 calculates a travel route from the current position of the vehicle 340 to the first parking slot determined in one of Steps 124, S128, S132, S134, and creates route information indicating the travel route. Using the route information created for one or more other vehicles in motion toward the vacant slot VA, the parking slot determination unit 106 calculates the travel route in such a manner as not to impede the travel of those vehicles. For example, using the travel speed of each vehicle and the route information created for the vehicle 340 in motion, the parking slot determination unit 106 may calculate the travel route so that the travel positions of a plurality of vehicles do not match at the same point in time. Furthermore, the parking slot determination unit 106 may calculate the travel route so that the travel positions of a plurality of vehicles do not match in a given period of time including the same point in time or are not located within a predetermined distance.

In Steps S122 to S136, the parking slot determination unit 106 determines the first parking slot according to a slot determination rule. The slot determination rule includes a rule in which, when there is more than one vacant slot VA (N≥2 in Step S122 shown in FIG. 5) and the first information included in the entry request indicates that a passenger is present ("PRESENT" in Step S130), the vacant slot VA among the plurality of vacant slots VA which is located at the shortest distance to the passenger exit PE and in which the vehicle 340 is allowed to be parked is to be selected as the first parking slot (Step S132). When the parking slot determination unit 106 determines the first parking slot according to this slot determination rule, the vacant slot VA located at the shortest distance to the passenger exit PE among the vacant slots VA is selected as the first parking slot regardless of whether the vehicle 340 is the autonomous vehicle 300 or the manually-operated vehicle 400 in the case where a passenger is present.

Note that when the parking slot determination unit 106 selects the wait slot WA as the first parking slot (Step S124) and creates the route information (Step S136) and after the vehicle 340 is parked in the wait slot WA, the number N of vacant slots becomes 1 or more, the following processes are performed. Specifically, the parking slot determination unit 106 calculates a travel route from the wait slot WA to the vacant slot VA and creates route information indicating the travel route. When the number N of vacant slots becomes 1 or more while the vehicle 340 is heading to the wait slot WA, the parking slot determination unit 106 performs the processes in Step S122 and the subsequent steps shown in FIG. 5. In these processes, when the vacant slot VA is selected as the first parking slot, route information according to which the vehicle 340 has been traveling may be changed from the route information indicating the route to the wait slot WA to route information indicating a route to the vacant slot VA.

Figure 6:
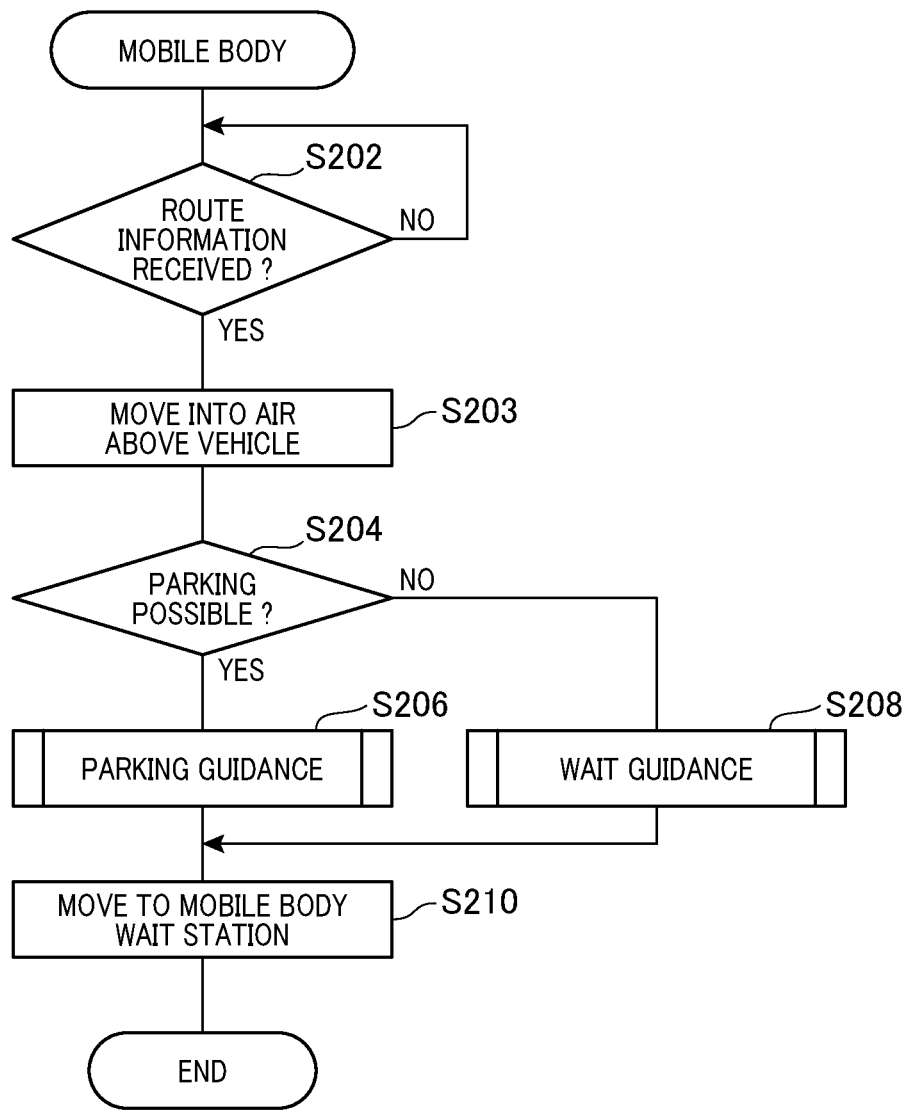
FIG. 6 is a flowchart showing the flow of a process performed in a mobile body.

As shown in FIG. 6, in the parking management system 10, the mobile body 200 waits to receive the route information (Step S202). Note that before receiving the route information, the mobile body 200 stands ready at a mobile body waiting area DW (refer to FIG. 3) to receive the route information. The mobile body waiting area can be arbitrarily set. For example, the mobile body waiting area may be set in the proximity of the management unit 100 shown in FIG. 3. When the vehicle 340 is determined as not having the autonomous driving function in Step S112 shown in FIG. 4 and the management unit 100 transmits the route information to the mobile body 200 in Step S114 shown in FIG. 4, the mobile body 200 receives the route information via the second communication unit 206.

Using the received route information, the controller 202 (refer to FIG. 2) of the mobile body 200 causes the mobile body 200 to move into the air above and in front of the current position of the manually-operated vehicle 400 (Step S203). The position, altitude, etc., of the mobile body 200 relative to the manually-operated vehicle 400 are not limited as long as the driver of the manually-operated vehicle 400 can visually recognize the display 210 of the mobile body 200.

Note that the management unit 100 transmits the identification information of the manually-operated vehicle 400 to the mobile body 200 together with the route information (refer to Step S114 in FIG. 4). Using the size information included in the identification information of the manually-operated vehicle 400, the mobile body 200 can determine the altitude thereof relative to the manually-operated vehicle 400 and fly in the air. Furthermore, using the identification information of the manually-operated vehicle 400 included in the entry request, the management unit 100 may determine the altitude of the mobile body 200 and transmit, to the mobile body 200, information indicating the altitude of the mobile body 200 together with the route information. Using the sensor 207, the camera 208, the GPS receiver 209, and the like, the controller 202 of the mobile body 200 causes the mobile body 200 to move to an appropriate position relative to the manually-operated vehicle 400.

Using the route information, the controller 202 determines whether the manually-operated vehicle 400 is allowed to be parked in the vacant slot VA (Step S204). When parking in the vacant slot VA is possible, that is, when the first parking slot indicated in the route information is the vacant slot VA, the controller 202 performs the parking guide process (Step S206). When the parking guide process (Step S206) ends, the controller 202 causes the mobile body 200 to move to the mobile body waiting area (Step S210). On the other hand, when parking in the vacant slot VA is not possible, that is, when the first parking slot is the wait slot WA, the controller 202 performs the wait guide process (Step S208). When the wait guide process (Step S208) ends, the controller 202 causes the mobile body 200 to move to the mobile body waiting area (Step S210).

Figure 7:
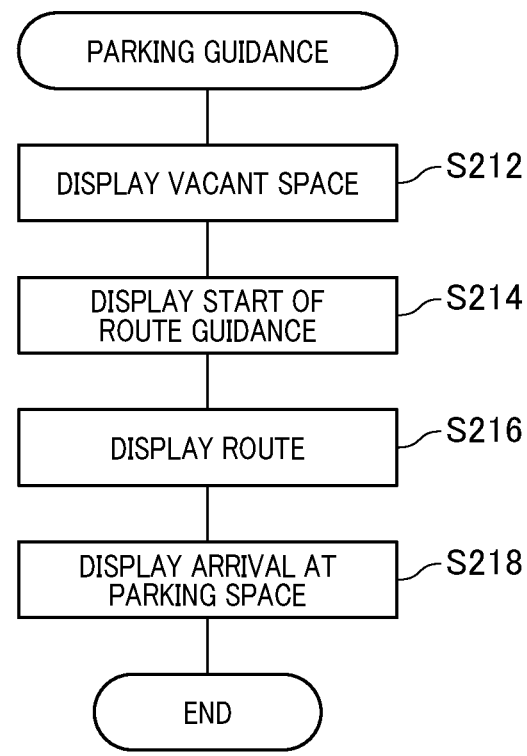
FIG. 7 is a flowchart showing the flow of a parking guide process.

FIG. 7 is a flowchart showing the flow of the parking guide process (refer to S208 in FIG. 6). FIGS. 8A to 8D are explanatory diagrams each showing an indication on the display that is presented during parking guidance. With reference to FIGS. 7 and 8A to 8D, the parking guide process and the content displayed on the display 210 will be described. The content displayed in the process in each step shown in FIG. 7 is shown in FIGS. 8A to 8D. In FIGS. 8A to 8D, numbers that are the same as the step numbers in FIG. 7 are attached to "M" as reference signs for the messages displayed on the display 210.

Figure 8A:
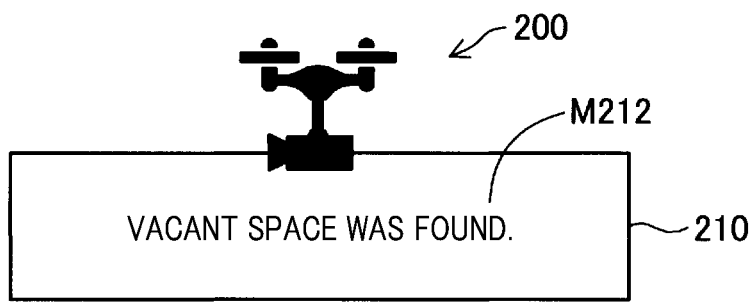
FIG. 8A is an explanatory diagram showing an indication on a display that is presented during parking guidance.

In Step S212 in FIG. 7, the controller 202 of the mobile body 200 causes the display 210 of the mobile body 200 to display a message indicating that there is a vacant slot. For example, as shown in FIG. 8A, a message M212 that reads: "VACANT SPACE WAS FOUND." is displayed on the display 210. Although the present embodiment illustrates an example in which the vacant slot VA is indicated as the "VACANT SPACE" in consideration of easiness in understanding for the driver of the manually-operated vehicle 400, a term indicating the vacant slot VA can be selected as appropriate.

Figure 8B:
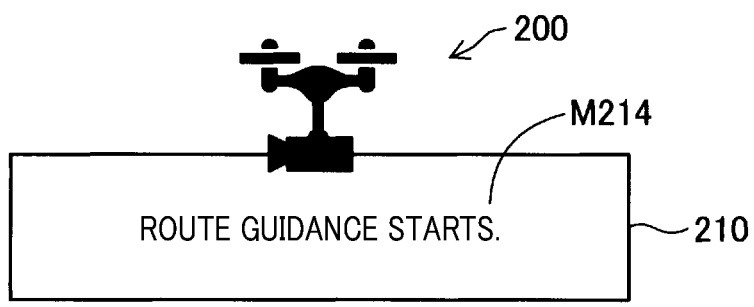
FIG. 8B is an explanatory diagram showing an indication on the display that is presented during the parking guidance.

In Step S214 in FIG. 7, the controller 202 of the mobile body 200 causes the display 210 of the mobile body 200 to display a message indicating that the route guidance starts. For example, as shown in FIG. 8B, a message M214 that reads: "ROUTE GUIDANCE STARTS." is displayed on the display 210.

Figure 8C:
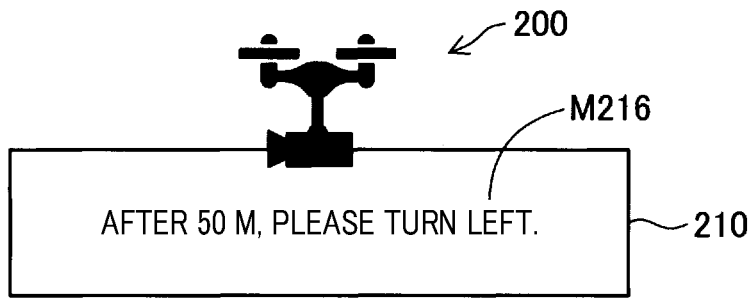
FIG. 8C is an explanatory diagram showing an indication on the display that is presented during the parking guidance.

In Step S216 in FIG. 7, the controller 202 of the mobile body 200 causes the display 210 of the mobile body 200 to display a message showing a travel route for the manually-operated vehicle 400, and causes the mobile body 200 to move using the route information. The message showing the travel route for the manually-operated vehicle 400 is sequentially changed and displayed on the display 210 of the mobile body 200. For example, the message to be displayed on the display 210 of the mobile body 200 is changed, as appropriate, to "PLEASE HEAD STRAIGHT FOR 100 M.", "AFTER 50 M, PLEASE TURN LEFT.", or "FOURTH SPACE ON THE LEFT IN THE DIRECTION OF TRAVEL". FIG. 8C shows an example in which a message M216 which reads: "AFTER 50 M, PLEASE TURN LEFT." is displayed on the display 210. The controller 202 of the mobile body 200 cause the mobile body 200 to fly at a predetermined flight speed according to the route information in such a manner as to lead the manually-operated vehicle 400. Upon leading the manually-operated vehicle 400, the sensor 207 and the camera 208 (refer to FIG. 2) are preferably used to recognize the manually-operated vehicle 400 and change the flight speed, the flying position, etc.

Figure 8D:
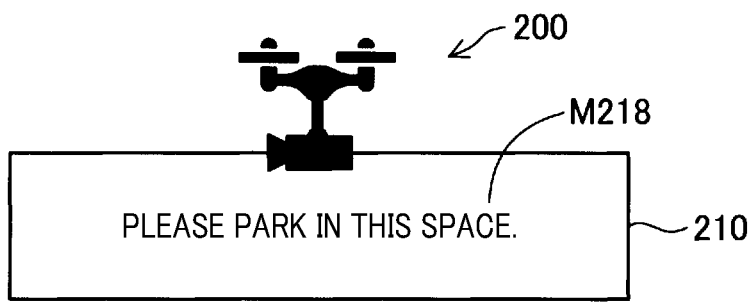
FIG. 8D is an explanatory diagram showing an indication on the display that is presented during the parking guidance.

When the mobile body 200 arrives at the first parking slot in which the vehicle 340 that has transmitted the entry request is to be parked, the controller 202 of the mobile body 200 causes the display 210 of the mobile body 200 to display a message indicating arrival at the parking slot in which the manually-operated vehicle 400 is to be parked (Step S218 in FIG. 7). For example, as shown in FIG. 8D, a message M218 which reads: "PLEASE PARK IN THIS SPACE." is displayed on the display 210 of the mobile body 200. Using the positioning result of the GPS receiver 209 about the current position of the mobile body 200 and information indicating the first parking slot included in the route information, the controller 202 of the mobile body 200 can determine that the mobile body 200 has arrived at the first parking slot.

Figure 9:
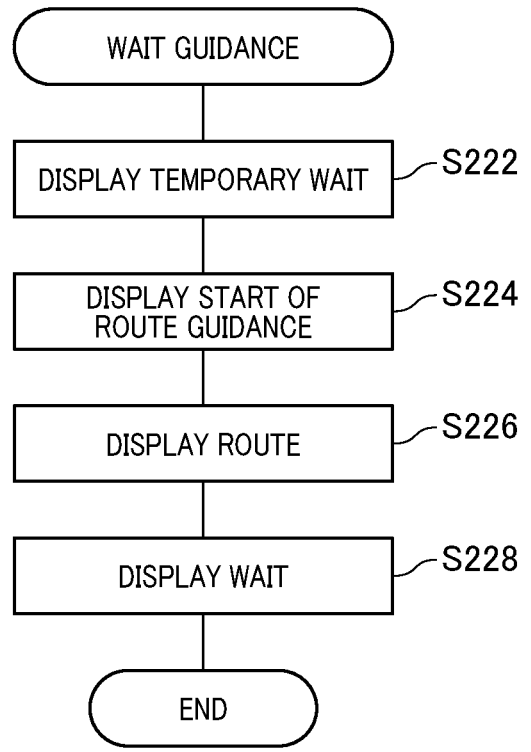
FIG. 9 is a flowchart showing the flow of a wait guide process.

FIG. 9 is a flowchart showing the flow of the wait guide process (refer to S208 in FIG. 6). FIGS. 10A to 10D are explanatory diagrams each showing an indication on the display that is presented during wait guidance. With reference to FIGS. 9 and 10A to 10D, the wait guide process and the content displayed on the display 210 are described. The content displayed in the process in each step shown in FIG. 9 is shown in FIGS. 10A to 10D. In FIGS. 10A to 10D, numbers that are the same as the step numbers in FIG. 9 are attached to "M" as reference signs for the messages displayed on the display 210.

Figure 10A:
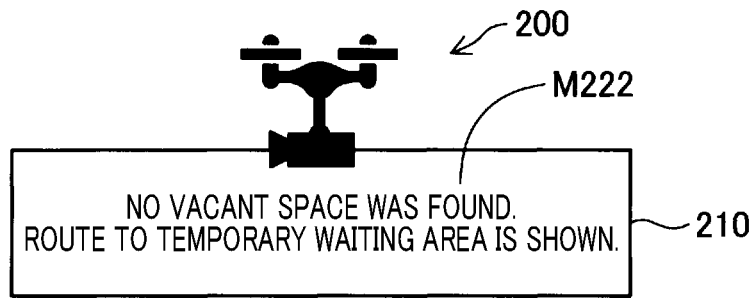
FIG. 10A is an explanatory diagram showing an indication on the display that is presented during wait guidance.

In Step S222 in FIG. 9, the controller 202 of the mobile body 200 causes the display 210 of the mobile body 200 to display a message indicating that there is no vacant slot VA and guidance to the wait slot WA will start is shown. For example, as shown in FIG. 10A, a message M222 that reads: "NO VACANT SPACE WAS FOUND. ROUTE TO TEMPORARY WAITING AREA IS SHOWN." is displayed on the display 210. Although the present embodiment illustrates an example in which the wait slot WA is indicated as the "TEMPORARY WAITING AREA" in consideration of easiness in understanding for the driver of the manually-operated vehicle 400, a term indicating the wait slot can be selected as appropriate.

Figure 10B:
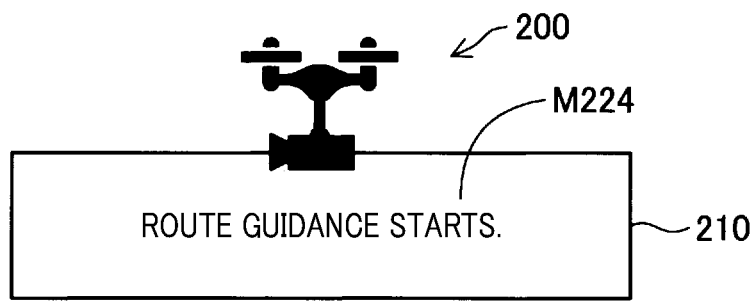
FIG. 10B is an explanatory diagram showing an indication on the display that is presented during the wait guidance.

In Step S224 in FIG. 9, the controller 202 of the mobile body 200 causes the display 210 of the mobile body 200 to display a message indicating that the route guidance starts. For example, as shown in FIG. 10B, a message M224 that reads: "ROUTE GUIDANCE STARTS." is displayed on the display 210.

Figure 10C:
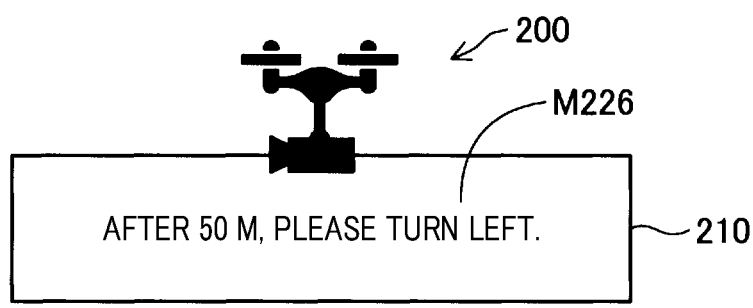
FIG. 10C is an explanatory diagram showing an indication on the display that is presented during the wait guidance.

In Step S226 in FIG. 9, the controller 202 of the mobile body 200 causes the display 210 of the mobile body 200 to display a message showing a travel route for the manually-operated vehicle 400, and causes the mobile body 200 to move using the route information. In Step S226, as in Step S216 in the parking guide process, the message showing the travel route for the manually-operated vehicle 400 is sequentially changed and displayed on the display 210 of the mobile body 200. FIG. 10C shows an example in which the message M216 which reads: "AFTER 50 M, PLEASE TURN LEFT." is displayed on the display 210.

Figure 10D:
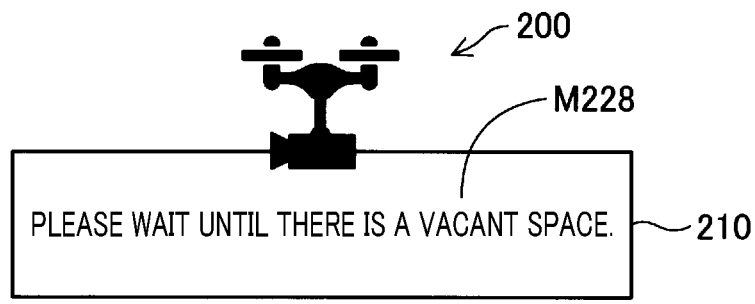
FIG. 10D is an explanatory diagram showing an indication on the display that is presented during the wait guidance.

When the mobile body 200 arrives at the wait slot WA as the first parking slot in which the vehicle 340 that has transmitted the entry request is to be parked, the controller 202 of the mobile body 200 causes the display 210 of the mobile body 200 to display a message indicating an instruction to wait. For example, as shown in FIG. 10D, the phrase "WAIT UNTIL THERE IS A VACANT SPACE." is displayed on the display 210.

The driver of the manually-operated vehicle 400 visually checks the message displayed on the display 210 of the mobile body 200, drives the manually-operated vehicle 400 according to the instruction, and parks the manually-operated vehicle 400 in the vacant slot VA or the wait slot WA.

Figure 11:
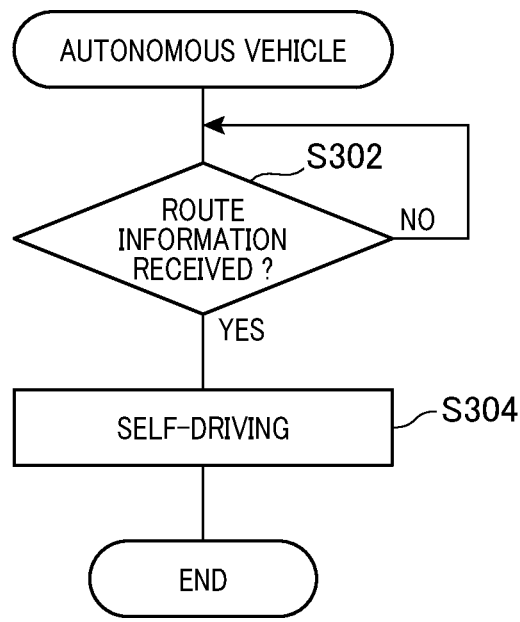
FIG. 11 is a flowchart showing the flow of a process performed in an autonomous vehicle.

FIG. 11 is a flowchart showing the flow of a process performed in the autonomous vehicle. The autonomous driving controller 302 of the autonomous vehicle 300 that has transmitted the entry request (refer to FIG. 2 and S106 in FIG. 4) waits to receive the route information (Step S302 in FIG. 11). When the management unit 100 transmits the route information to the autonomous vehicle 300 (refer to Step S116 in FIG. 4), the autonomous driving controller 302 of the autonomous vehicle 300 receives the route information via the third communication unit 304. Using the received route information, the autonomous driving controller 302 causes the autonomous vehicle 300 to drive itself and park itself in the vacant slot VA or the wait slot WA.

As described above, according to the parking management method implemented by the parking management system 10 in the present embodiment, when there are a plurality of vacant slots VA (N≥2 in S122 in FIG. 5) and a passenger is present in the vehicle 340 that has transmitted the entry request ("PRESENT" in S130 in FIG. 5), the vacant slot VA located at the shortest distance to the passenger exit PE among the plurality of vacant slots VA is determined as a parking slot (that is, the first parking slot) in which the vehicle 340 that has transmitted the entry request is to be parked (refer to S132 in FIG. 5). Therefore, a passenger of the vehicle 340 can quickly exit the parking lot through the passenger exit PE after parking. In other words, in a situation in which the parking lot is shared by a manned vehicle and an unmanned vehicle (that is, an autonomous vehicle), a parking slot convenient for a passenger is selected for the manned vehicle. Therefore, regardless of whether the vehicle is an autonomous vehicle or a manually-operated vehicle, the convenience for passengers improves.

Furthermore, in the parking management system 10 according to the present embodiment, the mobile body 200 includes a display 210 that displays a route guide (refer to FIGS. 2, 8A to 8D, and 10A to 10D). Therefore, even if the manually-operated vehicle 400 is not configured to be able to communicate with the management unit 100, the driver of the manually-operated vehicle 400 can be informed of the travel route calculated by the management unit 100. Subsequently, the driver of the manually-operated vehicle 400 can park the manually-operated vehicle 400 in an appropriate vacant slot VA by driving the manually-operated vehicle 400 according to the guidance provided by the mobile body 200.

The management unit 100 calculates the travel route in such a manner as not to impede the travel of a vehicle that has not been parked (refer to S136 in FIG. 5). Therefore, as long as the driver of the manually-operated vehicle 400 drives the manually-operated vehicle 400 according to the guidance provided by the mobile body 200, inconvenience in the parking lot that is due to coexistence of the autonomous vehicle 300 and the manually-operated vehicle 400 can be suppressed. The inconvenience in the parking lot that is due to coexistence of the autonomous vehicle 300 and the manually-operated vehicle 400 is, for example, interruption of self-driving due to the manually-operated vehicle 400 impeding the travel of the autonomous vehicle 300 or earlier parking of the autonomous vehicle 300 in the vacant slot VA in which the driver of the manually-operated vehicle 400 intended to park the vehicle.

Furthermore, in the present embodiment, the management unit 100 is configured to be able to receive the entry request transmitted from the mobile terminal 410 carried by a passenger of the manually-operated vehicle 400 (refer to FIG. 2). Therefore, even if the manually-operated vehicle 400 does not have a means for transmitting an entry request, the parking management system 10 can be used. As a result, the driver of the manually-operated vehicle 400 can easily use a parking lot in which the parking management system 10 is used.

Furthermore, in the present embodiment, when the number N of vacant slots VA is 1, the management unit 100 gives priority to the manually-operated vehicle 400 over the autonomous vehicle 300 and determines the vacant slot VA as the first parking slot for the manually-operated vehicle 400 (refer to S127 and S124 in FIG. 5). In other words, when the autonomous vehicle 300 and the manually-operated vehicle 400 transmit entry requests in the same period of time, the wait time for the manually-operated vehicle 400 can be set shorter than the wait time for the autonomous vehicle 300. There is at least a driver in the manually-operated vehicle 400. Therefore, as a result of this process, the convenience for passengers improves.

Furthermore, in the present embodiment, when the parking lot P includes the wait slot WA and the parking lot P is full, the parking slot determination unit 106 selects the wait slot WA as the first parking slot and creates the route information (refer to S122, S124, and S136 in FIG. 5). Therefore, it is possible to reduce occurrences of inconvenience that is due to an undetermined destination of the vehicle 340 when the parking lot P is full.

B. Second Embodiment

Figure 12:
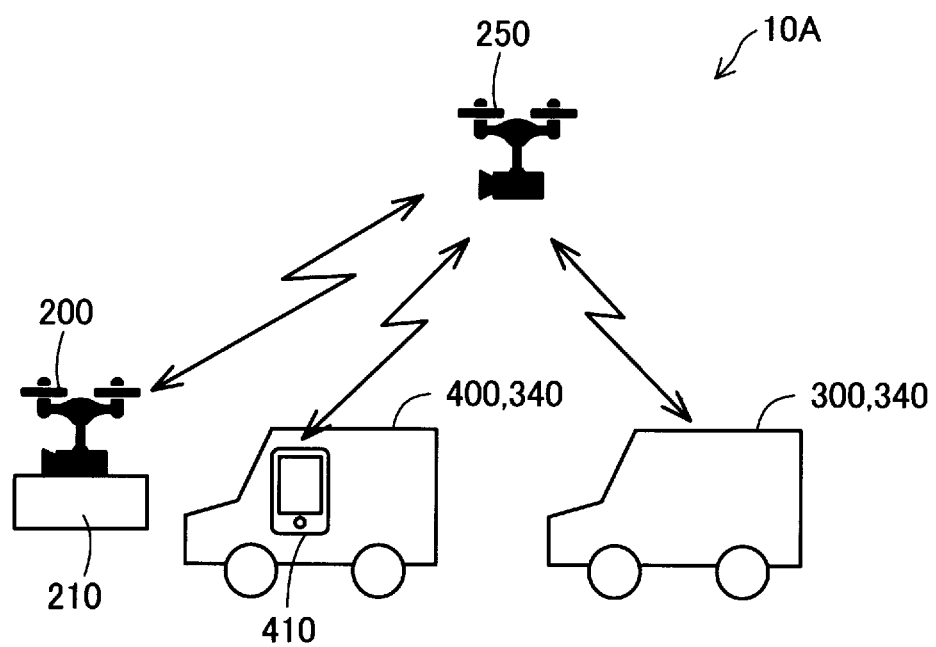
FIG. 12 is a schematic diagram schematically showing a parking management system according to the second embodiment.

As shown in FIG. 12, a parking management system 10A according to the second embodiment includes two mobile bodies, namely, a first mobile body 200 and a second mobile body 250 capable of moving separately from the first mobile body 200. The parking management system 10A shown in FIG. 12 is different from the parking management system 10 according to the first embodiment (refer to FIG. 1) in that the parking management system 10A includes the second mobile body 250 instead of the management unit 100 and the vacant slot sensor 500. The second mobile body 250 according to the present embodiment fulfills the functions of the management unit 100 and the vacant slot sensor 500 according to the first embodiment (refer to FIG. 1). Specifically, the second mobile body 250 mainly includes a function of detecting a vacant slot and a function of creating route information, and the mobile body 200 includes a function of guiding the manually-operated vehicle 400. In the parking management system 10A according to the present embodiment, elements that are the same as those in the parking management system 10 according to the first embodiment are assigned the same reference signs as those in the first embodiment.

Figure 13:
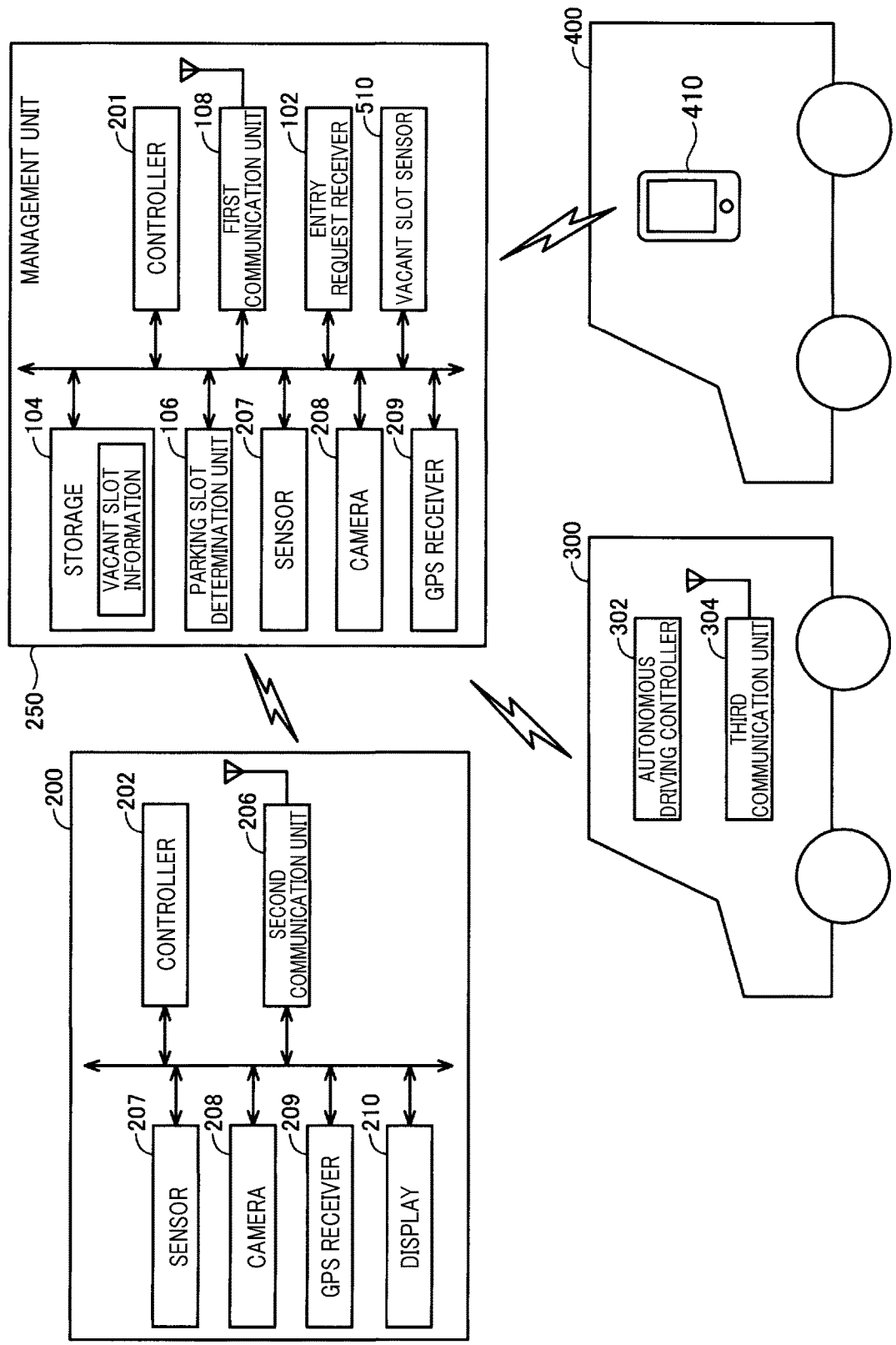
FIG. 13 is a block diagram showing a schematic configuration of the parking management system according to the second embodiment.

As shown in FIG. 13, the mobile body 200 has substantially the same structure as that of the mobile body 200 according to the first embodiment. The second mobile body 250 has substantially the same structure as a structure resulting from adding the structures of the management unit 100 and the vacant slot sensor 500 according to the first embodiment to the mobile body 200. Note that the second mobile body 250 includes a controller 201 having both the function of the controller 202 of the mobile body 200 and the function of the controller 101 included in the management unit 100 according to the first embodiment. Furthermore, the second mobile body 250 includes a vacant slot sensor 510 instead of the vacant slot sensor 500. The vacant slot sensor 510 is different from the vacant slot sensor 500 in that the vacant slot sensor 510 detects the vacant slot VA using an image captured by the camera 208 included in the second mobile body 250 whereas the vacant slot sensor 500 detects the vacant slot VA using an image captured by the camera CA which is an infrastructural camera.

During a period of time in which the parking lot P (refer to FIG. 3) is open to use, the second mobile body 250 flies in the air above the parking lot P, performs image capture by the camera 208 and positioning by the GPS receiver 209, and using these results, detects the vacant slot VA. The second mobile body 250 moves separately from the first mobile body 200.

In the parking management system 10A according to the present embodiment, the second mobile body 250 performs the processes (refer to FIGS. 4 and 5) of the management unit 100 according to the first embodiment. The mobile body 200 performs substantially the same process as the process (refer to FIG. 6) of the mobile body 200 according to the first embodiment. Therefore, regarding the process of the parking management system 10A, the earlier description is referred to by replacing the management unit 100 described in the first embodiment with the second mobile body 250. Note that in the parking management system 10 according to the first embodiment, the management unit 100 receives the vacant slot information VI from the vacant slot sensor 500 and stores the vacant slot information VI into the storage 104, whereas in the parking management system 10A according to the present embodiment, the vacant slot sensor 510 creates the vacant slot information VI and stores the vacant slot information VI into the storage 104.

As described above, the parking management system 10A according to the present embodiment includes the first mobile body 200 and the second mobile body 250 (refer to FIG. 12). Therefore, for example, even when the parking lot does not include a stationary camera or the like, a parking management system that produces substantially the same effects as in the first embodiment can be easily provided. Furthermore, the vacant slot VA can be detected at low cost as compared to the case of installing, in a parking lot including no stationary camera or the like, a stationary camera or a sensor that detects a vacant slot among the parking slots PA.

C. Other Embodiments (1) The above embodiments describe configurations in which the parking management systems 10, 10A include the mobile body 200 including the display 210, but a configuration in which the mobile body 200 is not included may be applied. For example, the route information created by the parking slot determination unit 106 may be transmitted to the mobile terminal 410, and route guidance may be provided using an image or speech. Furthermore, in the case where the manually-operated vehicle 400 is equipped with a car navigation system, the route information may be transmitted to the car navigation system. The route guidance may be provided using speech from a loudspeaker installed in the parking lot P. In such a case, the mobile terminal 410, the car navigation system, or the loudspeaker installed in the parking lot P that receives output of the parking slot determined by the parking slot determination unit for the vehicle to park and informs a passenger of the parking slot functions as a notifier.

(2) In the aforementioned configuration in which the mobile body 200 is not included, an element that indicates the travel route (for example, the mobile terminal 410, the car navigation system, etc.) does not need to be provided. For example, in the case of a parking lot open for autonomous vehicles 300 only, even when the parking management system does not include an element that indicates the travel route, the route information is transmitted to the autonomous vehicles 300, allowing a plurality of autonomous vehicles 300 to be properly parked. Also in this case, for autonomous vehicles 300 in which a passenger is present, the vacant slot VA located at the shortest distance to the passenger exit PE is selected as the first parking slot, and thus the convenience for passengers improves.

(3) The above embodiments describe examples in which the mobile body 200 includes the display 210 and the guidance indication of the travel route is displayed on the display 210, but a configuration in which an amplifier such as a loudspeaker is provided instead of the display 210 may be applied. Even with this configuration, by driving while listening to audio route guidance, the driver of the manually-operated vehicle 400 can park the manually-operated vehicle 400 in the first parking slot selected by the parking slot determination unit 106.

(4) In the above embodiments, in the case where the driver of the manually-operated vehicle 400 wishes to store the manually-operated vehicle 400, the entry request is transmitted from the mobile terminal 410, but the entry request may be transmitted from the car navigation system included in the manually-operated vehicle 400, for example.

(5) The above embodiments describe examples in which all the parking slots PA in the parking lot P have the same area, but there may be parking slots having different areas. For example, the vehicles 340 allowed to use the parking lot P are classified by the combination of the overall length and the vehicle width into two categories, the larger one as the first category and the smaller one as the second category. A parking slot having an area great enough for the vehicle 340 in the first category to park may be defined as a first category parking slot, and a parking slot which has an area great enough for the vehicle 340 in the second category and in which the vehicle 340 in the first category is not allowed to be parked may be defined as a second category parking slot. In such a case of the parking lot P including a plurality of parking slots having different areas, in Step S132 shown in FIG. 5, the parking slot determination unit 106 selects the vacant slot VA located at the shortest distance to the passenger exit PE among the vacant slots VA in which the vehicle 340 is allowed to be parked. For example, in the case of the vehicle 340 in the first category, when the vacant slot VA located at the shortest distance to the passenger exit PE among the plurality of vacant slots VA is the second category parking slot, said vacant slot VA is not selected, but, among the vacant slots VA in the first category parking slots, the vacant slot VA located at the shortest distance to the passenger exit PE is selected.

(6) The above embodiments describe examples in which the entry request includes the first information indicating the presence or absence of a passenger in the vehicle, but the entry request does not need to include the first information. For example, in the second embodiment, the parking slot determination unit 106 of the second mobile body 250 may be configured to determine the presence or absence of passengers including a driver using the image captured by the camera 208. In the case of this configuration, the combination of the parking slot determination unit 106 and the camera 208 is also referred to as the "first information obtainment unit".

In the above embodiments, the size information included in the identification information includes information indicating the height of the vehicle. In such embodiments, on the basis of the information indicating the height of the vehicle included in the size information of each vehicle 340 present in the parking lot P, the controller 101 of the management unit 100, the controller 201 of the second mobile body 250, etc., can determine the minimum level (hereinafter also referred to as the "minimum altitude") that the mobile bodies 200, 250 are allowed to fly in the parking lot P. The minimum altitude is greater than the height of each vehicle 340 present in the parking lot P. The mobile bodies 200, 250 fly higher than the minimum altitude. As a result, the probability of collision between the mobile bodies 200, 250 and the vehicle 340 can be reduced.

Furthermore, in another embodiment of the parking lot P, the height of a vehicle acceptable in at least some of the plurality of parking slots PA can be limited. For example, in the case where the parking lot P is a multilevel parking lot, such limitations can be set in a situation where at least some of the plurality of parking slots PA have roofs. In such an embodiment, upon selecting the vacant slot VA (Steps S132, S134 in FIG. 5), the parking slot determination unit 106 preferably selects, on the basis of information indicating the vehicle height of the vehicle 340 that has made the entry request, the vacant slot VA in which the vehicle 340 is allowed to be parked.

(7) The slot determination rule in the above embodiments may further include the following rules a to c, for example.

a. In the case where the parking lot P is an outdoor parking lot and includes a passenger walkway with a roof, when the weather is rain or snow, the vacant slot VA located at the shortest distance to the passenger walkway with the roof is to be selected as the first parking slot for the vehicle 340 in which a passenger is present.

Note that in the present embodiment, the distance between the vacant slot VA and the passenger walkway with the roof is the distance, on a map, between the position of the center of gravity of the vacant slot VA and a structural portion of the passenger walkway with the roof that is closest to the position of the center of gravity of said vacant slot VA. When there is more than one passenger walkway with a roof, the "distance to the passenger walkway with the roof" from each vacant slot VA is the distance to the passenger walkway with the roof closest to said vacant slot VA. The passenger walkway with the roof is one type of facilities which the passenger uses after alighting from the vehicle.

In other words, the distance between the vacant slot and a facility which a passenger uses after alighting from the vehicle can be the distance, on the map, between the position of the center of gravity of the vacant slot and a structural portion of the facility that is closest to the position of the center of gravity of said vacant slot. When there is more than one facility, the distance from each vacant slot to a facility which a passenger uses after alighting from the vehicle is the distance from the vacant slot to the closest facility which a passenger uses after alighting from the vehicle. Here, the "distance" may be a linear distance or may be a travel distance along a path for movement of pedestrians. Note that upon comparison between the distances from a plurality of vacant slots to a facility, the "distances" calculated according to the same criteria are used. Furthermore, upon the comparison between the distances from the plurality of vacant slots to the facility, the same facility or facilities having the same function (for example, the passenger exits PE1, PE2, PE3) are used as the "facility".

b. When there is more than one vacant slot VA located at the shortest distance to the passenger exit PE, the vacant slot VA closest to the current position of the vehicle 340 is selected.

c. The vacant slot VA located at the shortest distance to the passenger exit PE closest to a destination of a passenger of the vehicle 340 is selected.

For example, assume that in FIG. 3, the passenger exit PE1 is close to a movie theater, the passenger exit PE2 is close to a restaurant, and the passenger exit PE3 is close to a grocery floor. In this case, when the vehicle 340 designates the movie theater as a destination and this information is transmitted from the mobile terminal 410 to the management unit 100, the management unit 100 uses this information to select the vacant slot VA closest to the passenger exit PE1 as the first parking slot for the vehicle 340. Furthermore, the management unit 100 may obtain information indicating a schedule from the mobile terminal 410 carried by a passenger and analyze the information to specify a destination of the passenger. In this case, the destination of the passenger such as a movie theater is a facility which the passenger uses after alighting from the vehicle.

In each of the above examples, when a passenger is present in the vehicle, the vacant slot located at the shortest distance to a facility which the passenger uses after alighting from the vehicle is selected as the first parking slot (S132 in FIG. 5). However, a parking slot in which a vehicle that has transmitted an entry request can be selected according to other criteria. Note that among vacant slots which are included in the plurality of vacant slots and in which the vehicle is allowed to be parked, a vacant slot located at the first distance from a facility which a passenger uses after alighting from the vehicle is given a priority as a parking slot in which the vehicle is to be parked, over a vacant slot located at the second distance, which is greater than the first distance, from the facility. Giving the "priority" to the vacant slot located at the first distance from the facility as the parking slot means that out of the vacant slot located at the first distance from the facility and the vacant slot located at the second distance from facility, the vacant slot located at the first distance from the facility is regarded as the parking slot in the case where the other conditions are equal.

(8) The parking lot P does not need to include the wait slot WA. If the parking lot P does not include the wait slot WA, when the parking lot P is full, the parking lot P may be configured not to accept the vehicle 340, in other words, may be configured to cause the vehicle 340 to wait outside the parking lot P.

(9) The route information may include information indicating the travel speed of the vehicle 340. As a result of the route information including the information indicating the travel speed, the plurality of vehicles 340 can travel smoothly. For example, the mobile body 200 flies according to the travel speed of the vehicle 340 indicated in the route information, and the driver of the manually-operated vehicle 400 drives the manually-operated vehicle 400 in such a manner that the manually-operated vehicle 400 follows the mobile body 200, enabling smooth parking of the autonomous vehicle 300 and the manually-operated vehicle 400 without impedance of each other's travel.

(10) Although the above first embodiment describes an example in which the vacant slot sensor 500 detects the vacant slot VA using the image captured by the camera CA, the vacant slot VA may be detected, for example, using known sensors such as a light detection and ranging (LIDAR) sensor and an ultrasonic sensor.

(11) In the above embodiments, for the manually-operated vehicle 400, the entry request is transmitted from a software application installed on the mobile terminal 410 (refer to FIG. 1) carried by the passenger, and using this even as a trigger, the management unit 100 performs the parking management process (S106 in FIG. 4). However, the parking management process can be started by other triggers.

For example, in the case where the parking management system 10 has functions of an access point in a wireless LAN system, the following implementation of the parking management process is also possible. For example, (i) when the vehicle 340 has the functions of a wireless LAN client and the vehicle 340 holds the vehicle information (including the size information, the second information indicating the autonomous driving function, and the current position information) and the first information indicating the presence or absence of a passenger or the vehicle 340 can obtain said information, the following implementation is possible. First, in response to a beacon from the management unit 100 of the parking management system 10, the vehicle 340 transmits a probe request, and the management unit 100 transmits a probe response. Subsequently, after authentication, the management unit 100 transmits an association response for an association request from the vehicle 340, and thus connection is completed. When the connection is completed, the management unit 100 requests the vehicle 340 to transmit the vehicle information (including the size information, the second information indicating the autonomous driving function, and the current position information) and the first information indicating the presence or absence of a passenger. When receiving the vehicle information and the first information from the vehicle 340, the management unit 100 determines whether the current position of the vehicle 340 indicated in the current position information is within a predetermined range including the parking lot P. When the current position of the vehicle 340 is within the predetermined range including the parking lot P, the management unit 100 performs the process in Step S110 in FIG. 4 and subsequent processes in the first embodiment.

In such implementation, using the completion of the connection in the wireless LAN between the parking management system 10 and the vehicle 340 as a trigger, the vehicle information of a vehicle to which a parking slot is to be allocated is obtained (corresponding to S106 in FIG. 4), and thus the parking management process is started.

Note that the management unit 100 may receive, from the vehicle 340, information that allows the vehicle 340 to be unambiguously specified such as a MAC address of the vehicle 340, and obtain, on the basis of said information, the vehicle information and the first information of the vehicle 340 from a communication counterpart different from the vehicle 340.

(ii) In the case where the mobile terminal 410 carried by a passenger of the vehicle 340 or an in-vehicle device (for example, a car navigation system) mounted in the vehicle 340 has the functions of a wireless LAN client and holds or can obtain the vehicle information and the first information of said vehicle, the above process (i) can be performed in between the mobile terminal 410 or the in-vehicle device and the management unit 100 of the parking management system 10.

Note that the management unit 100 may receive, from the mobile terminal 410 or the in-vehicle device mounted in the vehicle 340, information that allows the vehicle 340 to be unambiguously specified such as a MAC address of the mobile terminal 410 or the in-vehicle device associated with the vehicle 340, and obtain, on the basis of said information, the vehicle information and the first information of the vehicle 340 from a communication counterpart different from the mobile terminal 410 and the in-vehicle device mounted in the vehicle 340.

Furthermore, when the parking management system 10, the mobile terminal 410, and the in-vehicle device mounted in the vehicle 340 have the functions of Bluetooth (registered trademark) instead of or in addition to the aforementioned wireless LAN functions, the following implementation is also possible. Specifically, using the event of the parking management system 10 being paired with the mobile terminal 410 and the vehicle 340 as a trigger, the parking management system 10 may obtain the vehicle information of a vehicle to which a parking slot is to be allocated (corresponding to S106 in FIG. 4) so that the parking management process is started.

(12) In the above-described embodiments, a part of the configuration implemented using hardware may be changed to be implemented using software, or conversely a part of the configuration implemented using software may be changed to be implemented using hardware. Where some or all of the functions in the present disclosure are implemented using software, this software (computer program) may be provided as a computer-readable recording medium having the software (computer program) stored therein. The "computer-readable recording medium" is not limited to a portable recording medium such as a flexible disk or a CD-ROM, and includes an internal storage device installed in a computer, such as various types of RAM or ROM, and an external storage device fixed to a computer, such as a hard disk drive. In other words, the "computer-readable recording medium" is used in a broad sense to include an arbitrary non-transitory recording medium that can store data packets.

The present disclosure is not limited to the above-described embodiments and can be implemented with various configurations within the spirit and scope of the present disclosure. For example, technical features in the embodiments that correspond to technical features of the aspect described in the Summary section can be replaced or combined, as appropriate, in order to solve part or all of the earlier-described problems or in order to achieve part or all of the earlier-described advantageous effects. Technical features can be deleted, as appropriate, unless the technical features are explained in this Description as essential.

The present disclosure can be implemented in the following form.

According to one aspect of the present disclosure, a parking management system (10, 10A) for managing parking of a vehicle (340, 300, 400) in a parking lot (P) including an exit for a passenger of the vehicle and a plurality of parking slots (PA) is provided. This parking management system includes: a vacant slot sensor (500, CA, 510, 208) which detects a vacant slot (VA, VA1, VA2, VA3) among the plurality of parking slots in the parking lot and creates vacant slot information (VI) indicating a position of the vacant slot; a vehicle information obtainment unit (102) which receives vehicle information of the vehicle; a first information obtainment unit (102) which obtains first information indicating presence or absence of a passenger of the vehicle; and a parking slot determination unit (106) which, using the vehicle information, the vacant slot information, and the first information, determines a parking slot in which the vehicle is to be parked, and outputs the parking slot, wherein when there are a plurality of the vacant slots and the first information indicates that a passenger is present, the parking slot determination unit determines, as the parking slot in which the vehicle is to be parked, a vacant slot located at a first distance from a facility which the passenger uses after alighting from the vehicle, preferentially over a vacant slot located at a second distance, which is greater than the first distance, from the facility, among vacant slots which are included in the plurality of the vacant slots and in which the vehicle is allowed to be parked.

With the parking management system according to this aspect, after the vehicle is parked, the passenger of the vehicle can quickly reach the facility which the passenger uses after alighting from the vehicle. Specifically, in a situation in which a manned manually-operated vehicle, a manned autonomous vehicle, and an unmanned autonomous vehicle share the parking spaces, a parking slot convenient for the passenger is selected in the case of the manned vehicle (manually-operated vehicle, autonomous vehicle). Therefore, the convenience for the passenger improves regardless of whether the vehicle is an autonomous vehicle or a manually-operated vehicle.

The present disclosure can be implemented in various forms other than the parking management system. For example, the present disclosure can be implemented in forms such as a mobile body, a management device, a parking management method, a computer program for performing said method, and a storage medium having said computer program recorded thereon.

What is claimed is:

1. A parking management system for managing parking of a vehicle in a parking lot including a plurality of parking slots, the parking management system comprising:
    a vacant slot sensor which detects a vacant slot among the plurality of parking slots in the parking lot and creates vacant slot information indicating a position of the detected vacant slot;
    a vehicle information obtainment unit which obtains, using a processor, vehicle information of a vehicle to which a parking slot is to be allocated;
    a first information obtainment unit which obtains, using the processor, first information indicating presence or absence of a person in the vehicle; and
    a parking slot determination unit which determines, using the processor, a parking slot in which the vehicle is to be parked based on the vehicle information, the vacant slot information, and the first information, and the parking slot determination unit outputs the parking slot, wherein
    when there are a plurality of vacant slots and the first information indicates that the person is present in the vehicle, the parking slot determination unit determines, as the parking slot in which the vehicle is to be parked, the detected vacant slot located at a first distance from a facility, preferentially over a detected vacant slot located at a second distance from the facility, among a plurality of detected vacant slots which are included in the plurality of vacant slots and in which the vehicle is allowed to be parked, the facility being used by the person after alighting from the vehicle, the second distance being greater than the first distance.

2. The parking management system according to claim 1, further comprising:
    a notifier capable of receiving an output of the parking slot in which the vehicle is to be parked and notifying the person of the output, wherein
    the vehicle information includes second information indicating presence or absence of an autonomous driving function of the vehicle, and
    when the second information indicates that the vehicle has the autonomous driving function, the parking slot determination unit transmits, to the vehicle, information of the parking slot in which the vehicle is to be parked, and when the second information indicates that the vehicle does not have the autonomous driving function, the parking slot determination unit transmits, to the notifier, the information of the parking slot in which the vehicle is to be parked.

3. The parking management system according to claim 2, further comprising:
    a first mobile body including the notifier, the first mobile body being configured to move while notifying the person in the vehicle of a route to the parking slot in which the vehicle is to be parked, to guide the vehicle to the parking slot in which the vehicle is to be parked.

4. The parking management system according to claim 3, further comprising:
    a second mobile body capable of moving separately from the first mobile body and including the vacant slot sensor, the vehicle information obtainment unit, and the parking slot determination unit.

5. The parking management system according to claim 1, wherein
    the parking lot includes a wait slot for the vehicle to wait, the wait slot being disposed at a position different from positions of the plurality of parking slots, and
    when there is no vacant slot detected, the parking slot determination unit determines the wait slot as the parking slot in which the vehicle is to be parked.

6. A parking management method for managing parking of a vehicle in a parking lot including a plurality of parking slots, the parking management method comprising the steps of:
    detecting a vacant slot among the plurality of parking slots in the parking lot, and creating vacant slot information indicating a position of the detected vacant slot;
    obtaining vehicle information of a vehicle to which a parking slot is to be allocated;
    obtaining first information indicating presence or absence of a person in the vehicle; and
    obtaining second information indicating whether the vehicle has an autonomous driving function;
    determining a parking slot in which the vehicle is to be parked, using the vehicle information, the vacant slot information, and the first information;
    determining whether the vehicle has the autonomous driving function, using the second information; and
    outputting the parking slot, wherein
    in determining of the parking slot in which the vehicle is to be parked, based on there being a plurality of the vacant slots and the first information indicating that the person is present in the vehicle, the detected vacant slot located at a first distance from a facility is determined as the parking slot in which the vehicle is to be parked, preferentially over a detected vacant slot located at a second distance from the facility, among a plurality of detected vacant slots which are included in the plurality of vacant slots and in which the vehicle is allowed to be parked, the facility being used by the person after alighting from the vehicle, the second distance being greater than the first distance, and
    (i) for a state in which the vehicle is determined to have the autonomous driving function, outputting the determined parking slot which includes the vacant slot, to the vehicle which has the autonomous driving function, and
    (ii) for a state in which the vehicle is determined to not have the autonomous driving function, outputting the determined parking slot which includes the vacant slot, to a mobile body which informs a driver of a manually-operated vehicle of a travel route.

7. A parking management system for managing parking of a vehicle in a parking lot including a plurality of parking slots, the parking management system comprising:
    a vacant slot sensor which detects a vacant slot among the plurality of parking slots in the parking lot and creates vacant slot information indicating a position of the detected vacant slot; and a controller comprising:
  a processor;
  a non-transitory computer-readable storage medium; and
  a set of computer-executable instructions stored on the non-transitory computer-readable storage medium that cause the processor to:
    obtain vehicle information of a vehicle to which a parking slot is to be allocated;
    obtain first information indicating presence or absence of a person in the vehicle;
    determine a parking slot in which the vehicle is to be parked based on the vehicle information, the vacant slot information, and the first information; and
    output the parking slot,
wherein
in determining of the parking slot in which the vehicle is to be parked, based on there being a plurality of the vacant slots and the first information indicating that the person is present in the vehicle, the detected vacant slot located at a first distance from a facility is determined as the parking slot in which the vehicle is to be parked, preferentially over a detected vacant slot located at a second distance from the facility, among a plurality of detected vacant slots which are included in the plurality of vacant slots and in which the vehicle is allowed to be parked, the facility being used by the person after alighting from the vehicle, the second distance being greater than the first distance.

* * * * *